US012661210B2

(12) United States Patent
Scommegna et al.

(10) Patent No.: US 12,661,210 B2
(45) Date of Patent: Jun. 23, 2026

(54) ORTHODONTIC EXPANDER

(71) Applicant: LEONE S.P.A., Sesto Fiorentino (IT)

(72) Inventors: Gabriele Scommegna, Tavernuzze Impruneta (IT); Maurizio Dolfi, Florence (IT)

(73) Assignee: LEONE S.P.A., Sesto Fiorentino (IT)

( * ) Notice: Subject to any disclaimer, the term of this patent is extended or adjusted under 35 U.S.C. 154(b) by 590 days.

(21) Appl. No.: 17/605,386

(22) PCT Filed: Mar. 12, 2020

(86) PCT No.: PCT/IT2020/050061
§ 371 (c)(1),
(2) Date: Oct. 21, 2021

(87) PCT Pub. No.: WO2020/234905
PCT Pub. Date: Nov. 26, 2020

(65) Prior Publication Data
US 2022/0218441 A1 Jul. 14, 2022

(30) Foreign Application Priority Data
May 23, 2019 (IT) ........................ 102019000007149

(51) Int. Cl.
*A61C 7/10* (2006.01)
(52) U.S. Cl.
CPC ..................................... *A61C 7/10* (2013.01)
(58) Field of Classification Search
CPC ...................................................... A61C 7/10
See application file for complete search history.

(56) References Cited

U.S. PATENT DOCUMENTS 5,167,500 A * 12/1992 Miura ...................... A61C 7/10
                                                              433/7
5,769,631 A * 6/1998 Williams ................. A61C 7/10
                                                              433/7
(Continued)

FOREIGN PATENT DOCUMENTS

DE       19637132 A1 * 3/1998 ............... A61C 7/10
EP       2 953 574 A1    12/2015
EP       2 953 574 B1    9/2016

OTHER PUBLICATIONS

International Search Report and Written Opinion of the International Searching Authority issued on Jul. 8, 2020 in corresponding International application No. PCT/IT2020/050061; 7 pages.

*Primary Examiner* — Ralph A Lewis
(74) *Attorney, Agent, or Firm* — Maier & Maier, PLLC

(57) ABSTRACT

Orthodontic expander including a left body)and a right body provided with through holes oriented along a pre-defined expansion direction, a pair of guides inserted in the holes, and elastic thrust elements preloaded and acting between the bodies to provide a thrust directed in the expansion direction in the orientation of moving away of the bodies. The guides and the bodies have respective surfaces engaging with each other to limit the expansion of the elastic elements, limiting the sliding to a maximum predetermined sliding value such that the preloading of the thrust means is greater than zero at this maximum predetermined sliding value such that the thrust exercised by the elastic elements is greater than zero at the maximum predetermined sliding value.

9 Claims, 3 Drawing Sheets

(56)                 References Cited

U.S. PATENT DOCUMENTS

| 6,309,213 | B1 * | 10/2001 | Forster | A61C 7/10 |
| | | | | 433/7 |
| 6,499,996 | B2 * | 12/2002 | Forster | A61C 7/10 |
| | | | | 433/7 |
| 11,273,012 | B2 * | 3/2022 | Scommegna | A61C 7/303 |
| 2016/0008098 | A1 * | 1/2016 | Dolfi | A61C 7/10 |
| | | | | 433/7 |
| 2020/0345458 | A1 * | 11/2020 | Scommegna | A61C 7/303 |
| 2022/0218441 | A1 * | 7/2022 | Scommegna | A61C 7/10 |

* cited by examiner

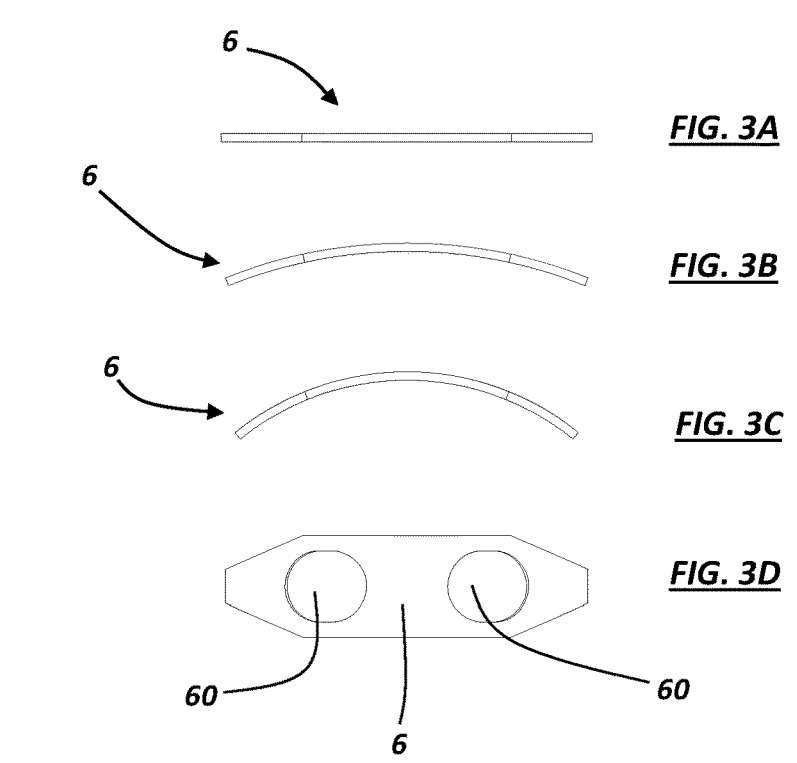
*FIG. 3A*
*FIG. 3B*
*FIG. 3C*
*FIG. 3D*
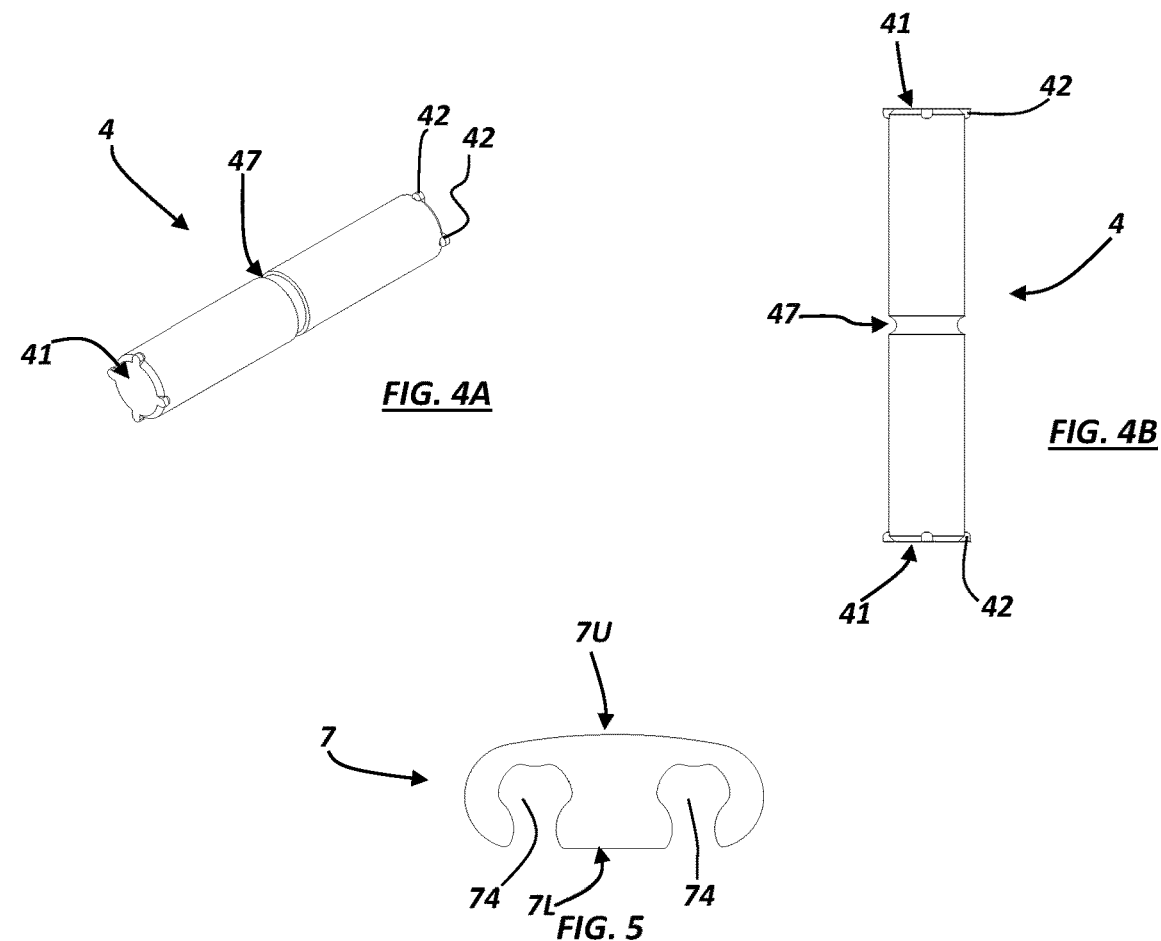
*FIG. 4A*
*FIG. 4B*
*FIG. 5*

ORTHODONTIC EXPANDER

FIELD

The present invention relates to an orthodontic expander, in particular it relates to a self-activated spring-loaded orthodontic expander.

BACKGROUND

It is known that an orthodontic expander is an intraoral device used for correcting the negative effects of transverse maxillary growth deficiency by the application of forces destined to increase the width of the dental arch in the transverse direction.

In general terms, an orthodontic expander consists of two bodies, respectively connected to dental elements of the right side and the left side of the dental arch by means of anchoring arms that are connected to each other by a central screw.

In the spring-loaded orthodontic expanders, between said two bodies is placed a coil spring which is compressed or "loaded" by the dentist through the central screw each time that the coil spring action is exhausted. The thrust exerted by the spring on the two bodies of the device is transmitted to the two corresponding sides of the dental arch thus determining, in a relatively long time and with the periodic loading of the spring, the desired expansion. Said spring is oriented parallel to the expansion direction, i.e. orthogonally to the two bodies that are connected to the teeth of the dental arch.

In the expanders of the type described above it is necessary to reactivate the springs periodically, by acting on the central screw. This operation is usually entrusted to the relatives of the person who uses the expander, given the relative simplicity of the operation itself. However, it may happen that the expander is not operated according to the indications given by the doctor, so the corrective action that the expander can perform may be compromised.

It is still felt the need of having an orthodontic expander which does not require a periodic reactivation of the elastic means during use and which, at the same time, ensures an almost complete correspondence of the action exerted by the expander to the prescriptions of the doctor and that is of simple and reliable manufacture.

The aforementioned requirements have been largely met by the orthodontic expander described in patent EP2953574B1, granted to the same applicant of the present patent application, and relating to an orthodontic expander comprising two bodies connected together, among which elastic means are provided which provide a thrust following their compression. In particular, referring to FIG. 1 of the attached drawings (which corresponds to FIG. 3 of the above document), the expander is provided with a left body (1) and a right body (2), each of which is provided with arms (3) which define the means for anchoring to the teeth of a dental arch. The bodies (1, 2) have through holes (10) oriented according to an expansion direction and are mounted on guides (4) inserted in said holes (10) so that the bodies slide along the guides. The elastic means (M) consist of several elastic plates or lamina (6) with a curvilinear profile oriented transversely with respect to said expansion direction.

SUMMARY

The expander of EP2953574B1 has proven very advantageous in terms of effectiveness in the treatments for which it was used.

Among the objects of the present invention there is that of providing an orthodontic expander capable of providing a more constant elastic reaction so as to determine a thrust of the expander which has substantially the same value from the beginning to the end of its decompression without substantial discontinuity in the application of the thrust.

The present invention aims to provide a device that satisfies the aforementioned requirements.

This result has been achieved, in accordance with the present invention, by adopting the idea of realizing an orthodontic expander having the features of a left body and a right body each having means for anchoring to the teeth of a dental arch and with through holes oriented along a pre-defined expansion direction, a pair of guides inserted in said holes so as to cause the sliding of said bodies along the same guides, and preloaded elastic thrust means and acting between said bodies to provide a thrust directed in said expansion direction in the orientation of moving away of said bodies, where said guides and said bodies have respective surfaces engaging with each other to limit the expansion of the elastic means, limiting said sliding to a maximum predetermined sliding value such that the preloading of said thrust means is greater than zero at this maximum predetermined sliding value such that the thrust exercised by the elastic means is greater than zero at said maximum predetermined sliding value, the thrust being provided by the preloaded elastic thrust means only along the entire sliding of the left and right bodies along the guides.

Other features of the present invention are indicated in the dependent claims.

Thanks to the present invention, it is possible to realize an even more efficient orthodontic expander, capable of providing a substantially constant thrust in all the phases of its decompression; the substantial invariability of the thrust provided by the spring allows the use of connection arms with a reduced diameter, with consequent advantages from the point of view of the ease of construction of the appliance and for the smaller size required; a high structural stability of the expander is also guaranteed, which has relatively reduced manufacturing costs in relation to the advantages offered.

These and further advantages and characteristics of the present invention will be better understood by any person skilled in the art, thanks to the following description and to the attached drawings, provided as an example but not to be considered in a limitative sense, in which:

BRIEF DESCRIPTION OF THE DRAWINGS

These and further advantages and characteristics of the present invention will be better understood by any person skilled in the art, thanks to the following description and to the attached drawings, provided as an example but not to be considered in a limitative sense, in which.

3

Figures 1, 2A, 2B, 2C, 2D, 2E, 2F:
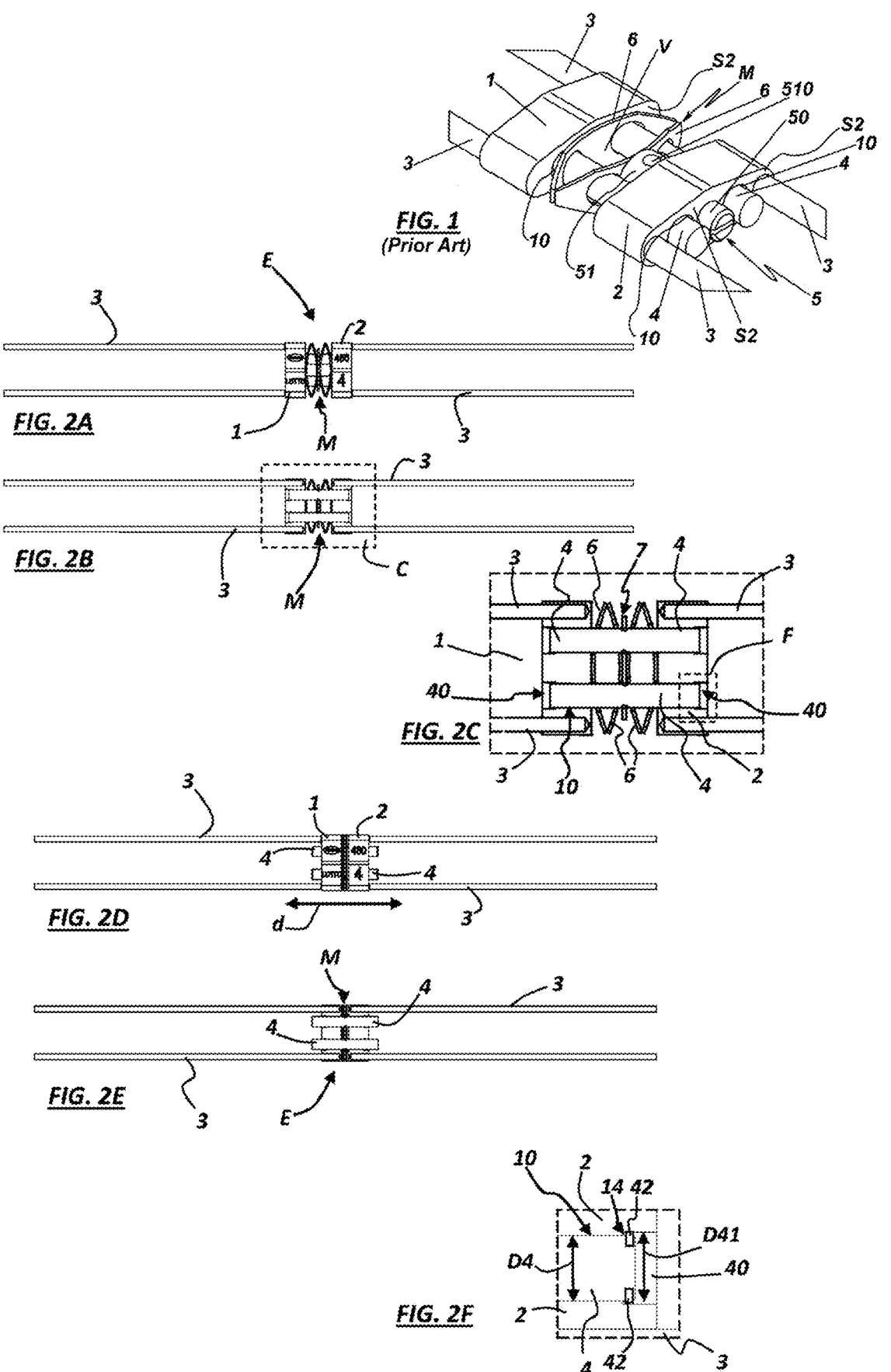
FIG. 1 is a perspective view of an orthodontic expander realized in accordance with EP2953574B1.
FIG. 2A relates to a possible embodiment of the present invention, represented in a configuration of maximum expansion (corresponding to the minimum compression) and shown in a top plan view.
FIG. 2B relates to a possible embodiment of the present invention, represented in a configuration of maximum expansion (corresponding to the minimum compression) and shown in a top plan view with removed parts.
FIG. 2C represents an enlarged view of the detail C of FIG. 2B.
Figure 6A:
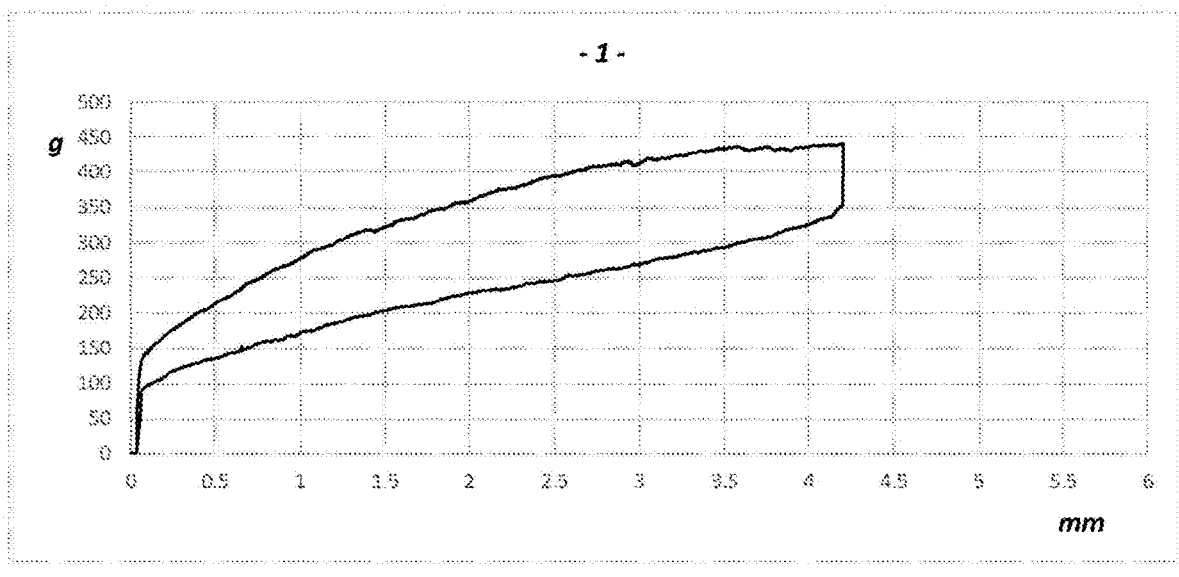
Figure 6B:
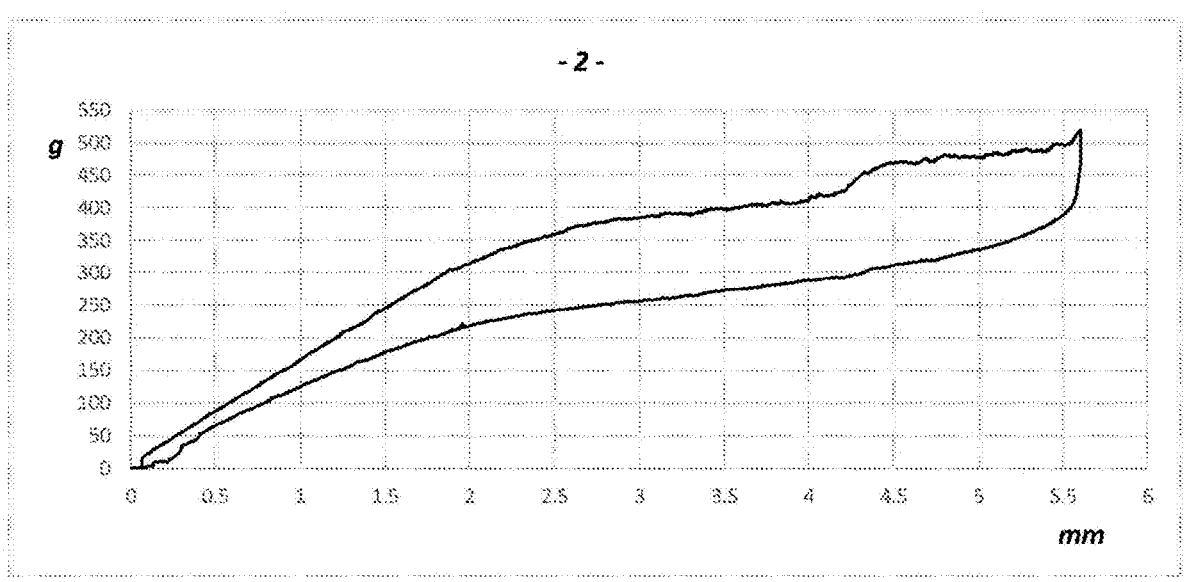

FIG. 2D relates to the embodiment shown in FIGS. 2A-B, represented in a configuration of minimum expansion (corresponding to the maximum compression) and shown in a top plan view;

FIG. 2E relates to the embodiment shown in FIGS. 2A-B, represented in a configuration of minimum expansion (corresponding to the maximum compression) and shown in a top plan view with removed parts;

FIG. 2F represents an enlarged view of the detail F of FIG. 2C;

FIG. 3A relates to a possible example of embodiment of a lamina for the formation of a spring according to the invention; the lamina is represented in side view and in a configuration of minimum expansion (corresponding to the maximum compression);

FIG. 3B relates to a possible example of embodiment of a lamina for the formation of a spring according to the invention; the lamina is represented in side view and in an intermediate configuration;

FIG. 3C relates to a possible example of embodiment of a lamina for the formation of a spring according to the invention; the lamina is represented in side view in a maximum expansion configuration (corresponding to the minimum compression);

FIG. 3D is a plan view of the lamina represented in FIG. 3C;

FIG. 4A refers to a possible example of construction of a guide according to the invention, represented in a perspective view;

FIG. 4B refers to a possible example of construction of a guide according to the invention, represented and in a plan view;

FIG. 5 relates to a possible example of construction of a bridge that can be fitted on the guides of an expander in accordance with the invention, shown in a front view;

FIG. 6A relates to a diagram that shows the force-displacement ratio by comparing the trend of a spring made according to the invention;

FIG. 6B relates to a diagram that shows the force-displacement ratio by comparing the trend of a spring made according to the invention (FIG. 6A) with that of a spring made according to the teachings of EP2953574B1 (FIG. 6B).

DETAILED DESCRIPTION OF THE EMBODIMENTS

Reduced to its essential elements and with reference to the figures of the accompanying drawings, an orthodontic expander according to the present invention has two bodies, i.e. a left body (1) and a right body (2), each of which is configured to be connected to a portion of the dental arch. For example, said bodies can be connected to the dental arch by means of two annular band (not shown in the attached drawings) through a corresponding pair of connection arms (3).

The connection to the dental arch can be made by means of annular bands connected to each body (1, 2) as said above or by means of anchoring portions consisting of a hollow body with an internal profile which copies the profile of a corresponding portion of the dental arch so as to be fitted on the latter, or by means of anchoring portions made and shaped substantially as dental aligner portions.

When annular bands are used, after fixing the bands to the selected teeth of the upper arch, or after fitting the anchoring portions on corresponding teeth of the upper arch, each body (1, 2) becomes fixed, by the corresponding pair of arms (3), to a corresponding left or right side of the upper dental arch. However, as said above, the bodies (1, 2) can be fixed in any suitable way to the dental arch.

The left and right bodies are connected to each other by a pair of rods or guides (4), parallel to each other, having a circular cross-section. Each rod (4) has a predetermined length, is inserted in a respective hole (10) of the left body (1) and passes through a homologous hole (20) of the right body (2), so that the two bodies (1, 2) are slidably mounted on the guides (4). The axes of the holes (10, 20) of the bodies (1, 2) are therefore oriented along the sliding direction (d) of the latter.

The two ends (41) of each guide (4) have a larger section. This larger section can be obtained, for example, by chamfering the same ends, in order to produce, on both ends of each guide (4), a diametrical enlargement which limits the sliding of the bodies (1, 2) on the guides as further described below. In the drawings said chamfers are marked by the reference (42). However, said cross section enlargement at the ends of the guides can be provided by any other convenient means. The guide (4) can also be provided with a groove (47), which can be used for its association with a bridge (7) described below.

As better shown in FIGS. 2C and 2F, each hole (10) is formed by two portions of different diameters, with the outer portion (40) having a larger diameter than the inner portion. The inner portion of the hole (10) is the one facing the inside of the expander (E), while the outer portion (40) is facing the outside. The sliding of the body (2) on the guides (4) is limited by the abutment provided by the chamfered parts (42) against the external edge (14) of the internal section of the holes (10).

Said bodies (1, 2) have opposite surfaces whose reciprocal distance varies according to the instantaneous position of the bodies (1, 2). In particular, this distance is comprised between a minimum value and a maximum value corresponding to the initial and, respectively, the final configurations of the expander, as further described below.

Between the opposite surfaces of the two bodies (1,2) deformable elastic means (M) of predetermined stiffness are positioned along the direction (d) defined by the guides (4). In other words, said elastic means (M) exert their action on the bodies (1, 2) along the direction (d) of the guides (4).

According to the example shown in the drawings, said elastic means consist of several plates or laminae (6) with an arcuate profile. For example, said plates are four in number and form two pairs of plates, i.e. one right pair and one left pair of plates; the two plates (6) of each pair have their respective concavities placed adjacent. Each plate (6) has a pair of elliptical holes (60) through which they are fitted on the guides (4). The holes (60) being elliptical shaped rather than circular shaped allow each plate (6) to deform freely along the direction of the guides (4) without interfering with the latter.

Said plates (6) can be made, for example, in nickel-titanium.

The plates (6), when compressed, exert an expansive force on the left body (1) and an expansive force of equal intensity, oppositely directed, on the right body (2), both along the direction of the guides (4). Correspondingly, the left and right arms of the expander apply expansive forces respectively on the left and right sides of the dental arch subjected to treatment.

The elastic means (M) formed by plates (6) fitted on guides (4) are described in EP2953574B1, in which the elastic reaction provided by the plates is expected to be used until the complete discharge of the plates. In practice, the spring means of EP2953574B1 is used from the maximum to the minimum compression, that is, between an initial configuration in which the spring is totally "loaded" and a final configuration in which the spring is totally "discharged". In other words, in EP2953574B1 each plate passes from an initial configuration substantially corresponding to that of FIG. 3A to a final configuration substantially corresponding to that of FIG. 3C.

According to the present invention, the spring (M) defined by the plates (6) never reaches the totally "discharged" configuration since the spring is initially brought to its "totally loaded" configuration (shown for example in FIGS. 2D and 2E) and it cannot completely discharge because the ends (41) of the guides (4) with a larger section are arranged at a predetermined distance which is lower than that which would allow the spring to be completely discharged.

In practice, an orthodontic expander according to the present invention comprises a left body (1) and a right body (2) each provided with means (3) for anchoring to the teeth of a dental arch and with through holes (10) oriented along a pre-defined expansion direction (d), a pair of guides (4) inserted in said holes (10) so as to cause the sliding of said bodies (1, 2) along the same guides (4), and elastic thrust means (M) preloaded and acting between said bodies (1, 2) to provide a thrust directed in said expansion direction in the orientation of moving away of said bodies (1, 2), said guides (4) and said bodies (1, 2) having respective surfaces (42, 14) engaging with each other to limit the expansion of the elastic means (M), limiting said sliding to a maximum predetermined sliding value such that the preloading of said thrust means (M) is greater than zero at this maximum predetermined sliding value such that the thrust exercised by the elastic means (M) is greater than zero at said maximum predetermined sliding value. FIGS. 6A and 6B show two force-displacement diagrams relating to the different force application between the case "1" of FIG. 6A, which shows the tests carried out with samples of an expander made in accordance with the present invention, and the case "2" of FIG. 6B, in which the tests were carried out with samples of an expander which allows the complete discharge of the spring are represented. Each of the two diagrams graphically represents the tests performed with a graph that shows on the abscissa axis the value of the stroke of bodies (1, 2) (expressed in mm) along guides (4) and on the ordinates the value of the thrust (expressed in grams) exerted by the elastic means (M).

The tests provided unexpected results. In fact, in all the tests of case 1 (FIG. 6A) the thrust reaches a considerable value more quickly and keep it until the end of said stroke.

On the contrary, in all the tests of case 2 (FIG. 6B) a greater stroke is required for the thrust to reach the highest value.

On an experimental level, the use of a spring determining a normal total stroke of bodies (1, 2) of 6 mm but in an appliance according to the present invention where the stroke of bodies (1, 2) is limited to 4 mm was particularly performing. In practice, the used spring (M) is formed by the juxtaposition of four plates (6), arranged for example as in FIGS. 2A-E, i.e. to form two pairs, one right and one left, and with the two plates (6) of each pair having their respective concavities placed adjacent. The spring (M) thus formed has a maximum extension, corresponding to the complete unloaded configuration, equal to 6 mm, and has been placed on an expander (E) in which the sliding limiting means, defined by the conformation of the guides (4) and the respective receiving holes (10) according to the example disclosed above, allow a stroke of only 4 mm.

In other words, experimentally it has been found that by using the spring for a value between ⅔ and ¾ (substantially ⅔ in the performed tests) of its maximum stroke, surprisingly advantageous results are obtained in terms of fluidity in the release of the reaction force by the spring and, in general, of improved performance of the orthodontic appliance using an expander (E) thus equipped.

This solution appears even more advantageous in the use of the spring expander (E) in removable devices in which the means of anchoring to the teeth is defined by portions superimposable on the dental arch also by the user himself. In practice, these portions superimposable on the teeth can advantageously consist of portions made by molding having a shape substantially similar to that of portions of a dental aligner.

The experimental tests carried out by the Applicant have shown that it is advantageously possible to use arms (3) having a diameter comprised between 0.7 mm and 1.3 mm, preferably between 0.9 mm and 1.1 mm, instead of the conventionally arms having a larger diameter of 1.5 mm This feature determines a first advantage related to the ease of manipulation of the same arms (3) by the dental technician during the construction of the dental appliance and a second advantage related to patient comfort due to the smaller encumbrance.

The use of the arms with a smaller diameter than the standard diameter does not cause any inconvenience since the spring (M) formed by the plates (6) arranged in the configuration described above determines the release of a force of known and substantially constant value.

Still with reference to the attached drawings, said guides (4) can be advantageously joined together by a bridge (7) arranged perpendicularly to the same guides.

Preferably, the bridge (7) is placed in a central position between the guides (4), i.e. in a central position with respect to the plates (6).

For example, the bridge (7) can consist of a metal lamina with an upper side (7U) and a lower side (7L), in which the lower side (7U) has two openings (74), each of which allows to fit the bridge (7) with elastic forcing on an annular groove (47) presented by a respective guide (4) in a central position. Advantageously, each of said openings (74), starting from the lower side (7L) of the bridge, first has a lower width and then a higher width. The centre-to-centre distance between the two openings (70) is equal to the centre-to-centre distance between the two guides (4) inserted in the bodies (1, 2). In its narrowest part, each opening (74) has a width smaller than the outer diameter of the guides (4) and greater than the diameter of the grooves (47). In this way, it is possible to position the bridge (7) on the guides (4) more easily but in any case ensuring a firm connection between the guides (4).

Said bridge (7) increases the stability of the expander, linking the guides (4) to each other, which, by virtue of the constraint thus created, are not free to move independently.

The plates (6) are positioned in a visible way, in the space between the bodies (1) and (2) of the expander, thus allowing the dentist to be able to easily check the state of compression/expansion.

The expander is positioned on the patient's upper dental arch in an initial loaded configuration, i.e. with the plates (6) kept compressed for example by means of a wire ring (not shown in the drawings) which initially connects the left (1) and right (2) bodies neutralizing the action of the plates (6). In this configuration, the distance between the bodies (1, 2)

has the minimum value which substantially corresponds to the space occupied by the plates (6) in the compressed configuration and by the bridge (7) if provided.

After the expander has been positioned on the dental arch, the wire is cut and therefore the laminas (6) apply expansive forces, respectively through the left and right expander bodies, on the left and right sides of the dental arch respectively.

Over time, under the pressure of the laminae (6), the dental structures on which the expander is applied expand and therefore the laminae (6) gradually flex until they are unloaded, but never completely, i.e. they are always able to apply a significant deformation force on the upper dental arch.

The bridge (7) which directly connects the guides (4) with each other contributes to a greater overall stability of the expander preventing any disjointed movement of the guides inside the holes (10, 20) of said bodies (1, 2). In practice, the bridge (7) constitutes a further constraint for the guides (4), in addition to that constituted by the bodies (1, 2) which constrain the guides with each other in an indirect manner In practice, the details of execution may in any case vary in an equivalent manner as regards the individual elements described and illustrated, without departing from the scope of the solution idea adopted and therefore remaining within the limits of the protection afforded by the present patent according to the claims.

The invention claimed is:

1. Orthodontic expander comprising:
   a left body and a right body each provided with means for anchoring to the teeth of a dental arch and with through holes oriented along a pre-defined expansion direction,
   a pair of guides inserted in said holes so as to cause the sliding of said bodies along the same guides from a first position in which the bodies are at a minimum reciprocal distance to a second position in which the bodies are at a maximum reciprocal distance for the expansion of the dental arch, and
   preloaded elastic means comprising elastic plates acting between said bodies to provide a thrust directed in said expansion direction in the orientation of moving away of said bodies, wherein:
   the two ends of each guide have a larger section, that are chamfered parts, providing on both ends of each guide a diametrical enlargement which limits the sliding of the bodies on the guides,
   the sliding of the body on the guides is limited by the abutment provided by the chamfered parts against an external edge of the internal section of the holes,
   said guides and said bodies have means for limiting the expansion of said elastic means that are respective surfaces of the chamfered parts and external edge engaging with each other to limit the expansion of the elastic means, limiting said sliding to a maximum predetermined sliding value such that the preloading of said thrust means is greater than zero at this maximum predetermined sliding value such that the thrust exercised by the elastic means is greater than zero at said maximum predetermined sliding value,
   said means for limiting the expansion of said elastic means block the discharge of said elastic means at a value included between 3/4 and 2/3 of their maximum extension, corresponding to a value between 3/4 and 2/3 of the complete discharge, and
   wherein said larger section portions of said guides do not pass through corresponding external edges of said holes,
   wherein said guides are constrained to each other by a bridge oriented orthogonally to the same guides so as to prevent the disjoint movement of the guides themselves.

2. Orthodontic expander according to claim 1, wherein said elastic means comprise elastic plates with a curvilinear profile oriented transversely with respect to said expansion direction and fitted on said guides in correspondence of corresponding perforated portions of the same plates.

3. Orthodontic expander according to claim 2, wherein said elastic plates are in an even number and are fitted in pairs on said guides, with the plates of each pair having the respective concavities placed adjacent.

4. Orthodontic expander according to claim 1, wherein said bridge comprises a lamina which, on a lower side, has two openings through which the bridge is fitted on the guides and each guide has an annular groove engaged by the bridge at said openings.

5. Orthodontic expander according to claim 1, wherein the bridge is in a central position between the guides.

6. Orthodontic expander according to claim 1, wherein said means for anchoring to the teeth of a dental arch comprise arms connected to corresponding orthodontic bands.

7. Orthodontic expander according to claim 1, wherein said means for anchoring to the teeth of a dental arch comprise arms connected to corresponding hollow bodies superimposable to teeth of dental arch portions and shaped so as to copy the profile of said portions of dental arch.

8. Orthodontic expander according to claim 1, wherein said means for anchoring to the teeth of a dental arch comprise arms having a diameter of between 0.7 mm and 1.3 mm.

9. Orthodontic expander according to claim 1, wherein said means for anchoring to the teeth of a dental arch comprise arms having a diameter comprised between 0.9 mm and 1.1 mm.

* * * * *